(12) United States Patent
Verma

(10) Patent No.: US 7,252,224 B2
(45) Date of Patent: Aug. 7, 2007

(54) FRONT COUNTER AND BACK COUNTER WORKFLOW INTEGRATION

(75) Inventor: Amar K Verma, Alpharetta, GA (US)

(73) Assignee: Alogent Corporation, Alpharetta, GA (US)

(*) Notice: Subject to any disclaimer, the term of this patent is extended or adjusted under 35 U.S.C. 154(b) by 0 days.

(21) Appl. No.: 11/210,003

(22) Filed: Aug. 23, 2005

(65) Prior Publication Data

US 2007/0045394 A1 Mar. 1, 2007

(51) Int. Cl.
G07F 19/00 (2006.01)

(52) U.S. Cl. .......................... 235/379; 705/35; 705/45

(58) Field of Classification Search ................ 235/379; 705/35, 45
See application file for complete search history.

(56) References Cited

U.S. PATENT DOCUMENTS

| 4,417,136 | A | * | 11/1983 | Rushby et al. .............. 235/379 |
| 5,668,897 | A | | 9/1997 | Stolfo |
| 5,689,579 | A | | 11/1997 | Josephson |
| 5,832,463 | A | * | 11/1998 | Funk ........................... 705/35 |
| 5,917,965 | A | | 6/1999 | Cahill et al. |
| 6,097,834 | A | | 8/2000 | Krouse et al. |
| 6,181,837 | B1 | | 1/2001 | Cahill et al. |
| 6,931,589 | B2 | | 8/2005 | Baltsan et al. |
| 7,062,456 | B1 | * | 6/2006 | Riehl et al. .................... 705/35 |
| 2002/0145035 | A1 | * | 10/2002 | Jones ......................... 235/379 |
| 2005/0108168 | A1 | * | 5/2005 | Halpin et al. ................. 705/45 |
| 2006/0000889 | A1 | * | 1/2006 | Ma et al. ..................... 235/379 |

FOREIGN PATENT DOCUMENTS

WO WO 03/046785 11/2001

* cited by examiner

Primary Examiner—Michael G. Lee
Assistant Examiner—Kristy A. Haupt
(74) Attorney, Agent, or Firm—Harness, Dickey & Pierce, P.L.C.

(57) ABSTRACT

A system and method for processing financial transactions includes an input receptive of cash and a plurality of images of physical items of the transaction, wherein the images contain a visual record of the transaction data such as an amount of monetary value. A front, counter transaction processor processes the cash and a first item image and generates front counter transaction data. A back counter transaction processor processes item images of the transaction and generates back counter transaction data. A match module matches back counter transaction data to front counter transaction data. An output is adapted to transmit front counter transaction data and back counter transaction data to at least one of form fields and a temporary transaction datastore.

26 Claims, 4 Drawing Sheets

FRONT COUNTER AND BACK COUNTER WORKFLOW INTEGRATION

FIELD OF THE INVENTION

The present invention generally relates to financial transaction systems, methods, and devices, and particularly to systems and methods of transactions at point presentment utilizing a front counter-back counter workflow integration.

BACKGROUND OF THE INVENTION

Financial institutions typically interact with parties to transactions, such as individuals, partnerships, companies, and corporations, by providing points of presentment at locations that are convenient to the parties to the transactions. Points of presentment include, for example, front counters of bank branches, cash vaults, merchant back offices, and automatic teller machines (ATMs) providing deposit automation. Parties to transactions present physical items embodying a transaction at these points of presentment, and these items typically include checks, cash, withdrawal slips, deposit slips, loan payment slips, and/or remittance slips.

While tellers often assist parties to transactions at some points of presentment, these tellers are typically required to spend excessive amounts of time and attention to data entry and transaction balancing. Furthermore, the tellers typically have no way of ensuring that all items of a transaction are valid. In addition, points of presentment affording no teller assistance rely entirely on the party to the transaction to ensure that the transaction is balanced. Thus, the teller's focus is on the transaction and not the customer.

Often, financial institution branches will assemble and process the transaction long after the party to the transaction has departed the point of presentment. As a result, unbalanced and/or invalid transactions are discovered late, without affording the party to the transaction or teller at the point of presentment an opportunity to correct or otherwise balance the transaction.

The need remains, therefore, for a system and method of processing a transaction at a point of presentment that improves quality control of transactions while reducing time and labor requirements at a point of presentment. The present invention fulfills this need.

SUMMARY OF THE INVENTION

In accordance with the present invention, a system and method for processing financial transactions includes an input receptive of cash and a plurality of images of physical items of the transaction, wherein the images contain a visual record of data associated with the transaction. A front counter transaction processor processes the cash and a first item image and generates front counter transaction data. A back counter transaction processor processes item images of the transaction and generates back counter transaction data. A match module matches back counter transaction data to front counter transaction data. An output is adapted to transmit front counter transaction data and back counter transaction data to either form fields or a temporary transaction datastore.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings; wherein.

DETAILED DESCRIPTION OF THE PREFERRED EMBODIMENT

Figure 1:
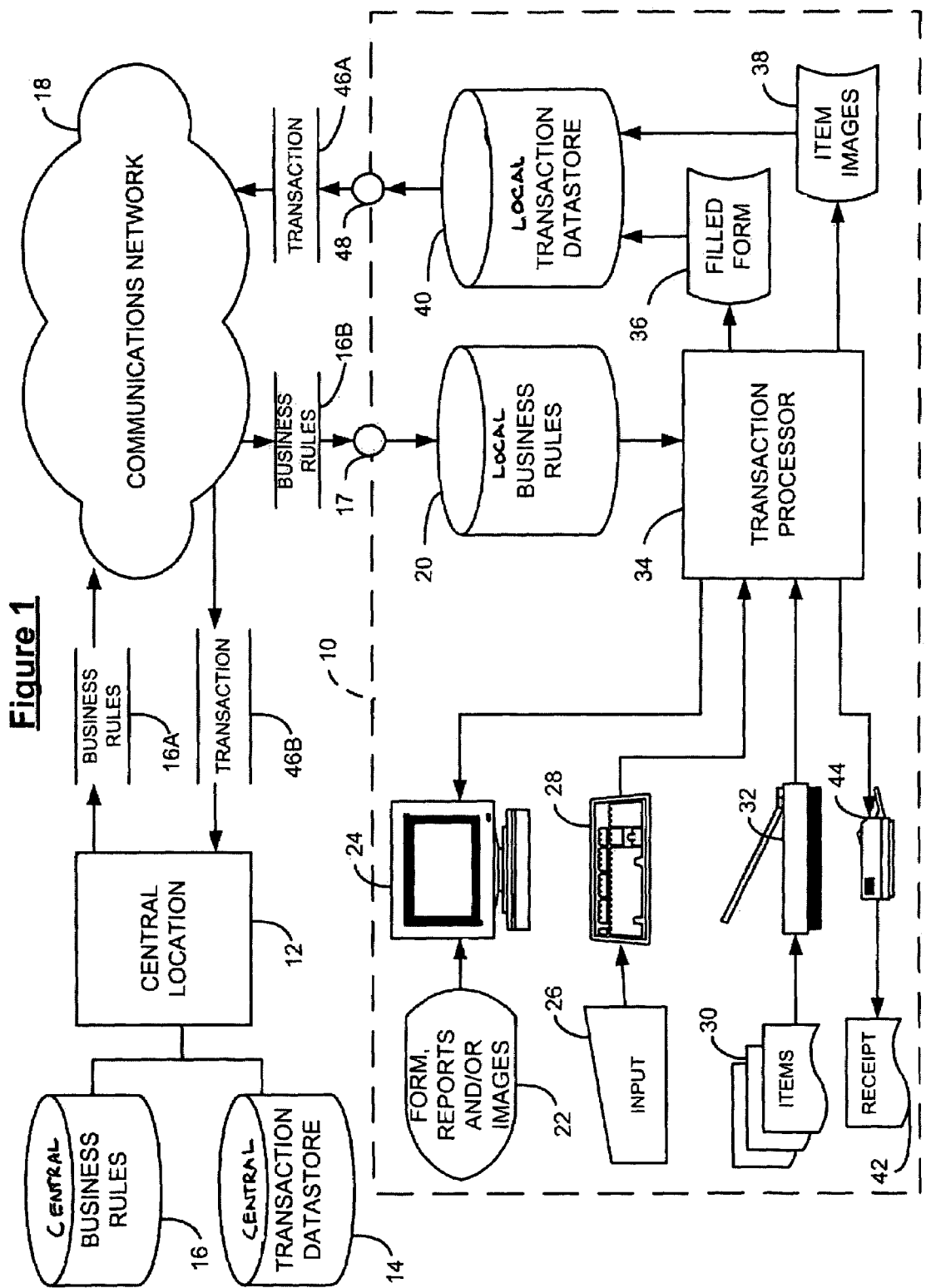
FIG. 1 is a an entity relationship diagram illustrating a financial transaction system implemented at a point of presentment according to the present invention.

The following description of the preferred embodiment is merely exemplary in nature and is in no way intended to limit the invention, its application, or uses. For purposes of clarity, the same reference numbers will be used in the drawings to identify similar elements.

FIG. 1 illustrates a point of presentment 10 implementing a front counter back counter integration method with an image-enabled, financial transaction processing system in accordance with the present invention. It is envisioned that a financial institution according to the present invention has a central location 12 with a central transaction datastore 14 and centralized business rules 16. The central location 12 promulgates central business rules 16 by periodically transmitting business rules data 16A over a communications network 18, such as the Internet, to plural points of presentment. In turn, point of presentment 10 daily receives rules data 16B via data input 17 and stores it in local rules datastore 20.

Local rules datastore 20 may store validation characteristics for authenticating identity of parties and/or items. Validation characteristics may include routing numbers for financial institutions, account numbers for parties to transactions, one or more signatures or other biometric characteristics of individuals, and/or encryption keys, hash functions, and similar code features relating to digital watermarks, holograms, and other item features. Business rules 16B of local datastore 20 also define how to identify a type of document item based on image features and/or codeline data, how to extract, recognize, and utilize features from different types of documents, and how to validate and balance different types of transactions.

In operation, an operator at the point of presentment 10, such as a teller assisting the party to the transaction or a customer of an ATM, initiates a transaction by selecting an electronic form 22 designated for performing the transaction from a visual screen 24 by providing input 26 to an input device 28. Input device 28 may be one of a keyboard, mouse, touchscreen, microphone with speech recognition capability, and/or other input mechanisms. If the operator selects to perform a deposit, the operator selects the deposit form and takes items 30, which may include a completed credit slip, checks and cash from the party to the transaction at the point of presentment 10. If the operator selects to process the complete transaction in a front counter mode while the party to the transaction is present, the cash is processed and each received check and credit slip is scanned using imaging and scanning mechanism 32. It is envisioned that scanning mechanisms that read magnetic ink image items, and sort items may be employed to validate and/or count a non-cash portion of the transaction. The complete transaction is then processed by transaction processor 34.

In accordance with the present invention, the operator also has the option of deferring the time consuming functions of transaction processor 34, such as capturing and validating each check, in a back counter mode as will be described in more detail below. Once transaction processor 34 has completed balancing the validated transaction, filled form 36 and item images 38 are stored in local transaction datastore 40. A receipt 42 for the party to the transaction is generated using printing device 44. The operator has the option of posting the complete transaction by communicating the transaction 46A and 46B stored in local transaction datastore 40 of point of presentment 10 to central transaction data store 14 of central location 12 via data output 48 and communications network 18.

The transaction processor 34 generally performs the tasks of assigning a unique identification number (DIN) to each item image, recognizing and extracting relevant data from item images, validating each image according to validation characteristics of business rules 16 and filling fields of electronic form 22 with validated extracted data. Corrections to field contents may be made by the operator interfacing with the application or an operator at a remote location using an input device 28 and/or scanning mechanism 32. Specifically, the transaction may be corrected by manual input or re-processing the item through the scanner to recognize and extract data. Transaction processor 34 balances the complete cash and/or check transaction and sends a validation decision along with the electronic from filling results back to the operator via visual screen 24. Transaction processor 34 posts data stored in temporary transaction datastore 40 to central transaction data store 14 upon receipt of input 26 command to post.

Figure 2:
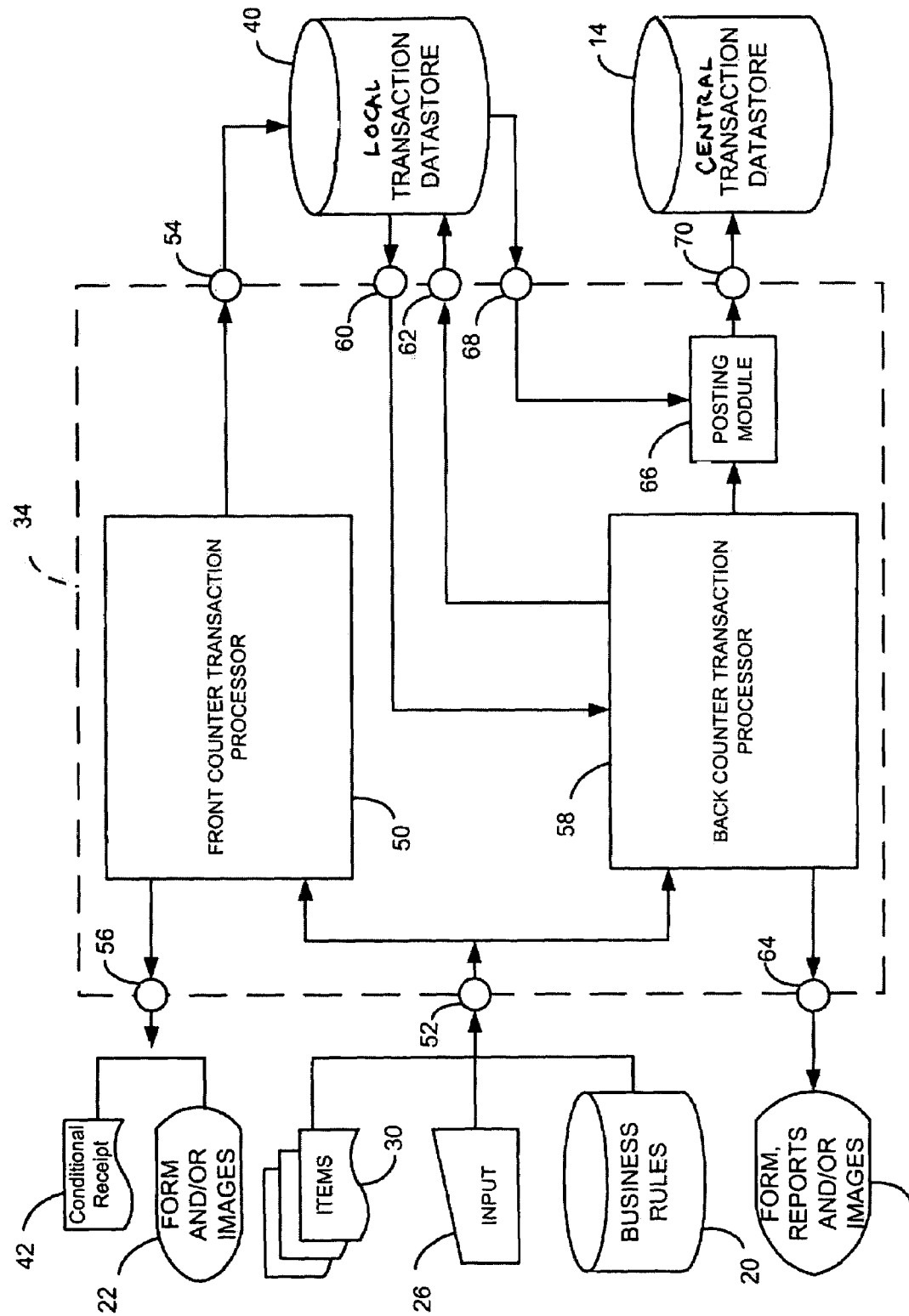
FIG. 2 is a functional block diagram illustrating an image-enabled, transaction processing system including a front counter back counter workflow for use at a point of presentment according to the present invention.

FIG. 2 illustrates a method for integrating front counter and back counter processing within transaction processor 34 at a point of presentment 10. The method captures work done in the front counter mode, where the application interfaces with the teller while the party to the transaction is present and the back counter mode where the application provides the ability to capture work in a standalone mode. Data input 52 is receptive of transaction items 30 such as credit slips, cash, checks, operator input 26 and business rules 20. Front counter transaction processor 50 inputs data 52 and provides the operator with the ability to capture items 30 of the transaction, to determine a conditional balance of the transaction and to conditionally complete a transaction including a conditional tag to local transaction data store 40 via data output 54. Data output 56 is receptive of front counter transaction processor data. Such data is used to generate a conditional receipt 42 for the party to the transaction and allow the operator to view filled forms and/or images 22 of the transaction.

Back counter transaction processor 58 inputs data 52 and provides the operator the ability to reprocess items 26 of the transaction according to business rules from local rules datastore 20 and match the transaction to data from the partially processed front counter transaction data via data input 60. Data output 62 is receptive of the back counter transaction processor data and is stored in the local transaction datastore 40. Filled forms, reports and images of back counter transaction processor are viewable via data output 64. Posting module 66 of transaction processor 34 allows the completed transaction data accessible from local transaction datastore 40 via data input 68 to be posted via data output 70 to central transaction datastore 14 of central location 12.

Figure 3:
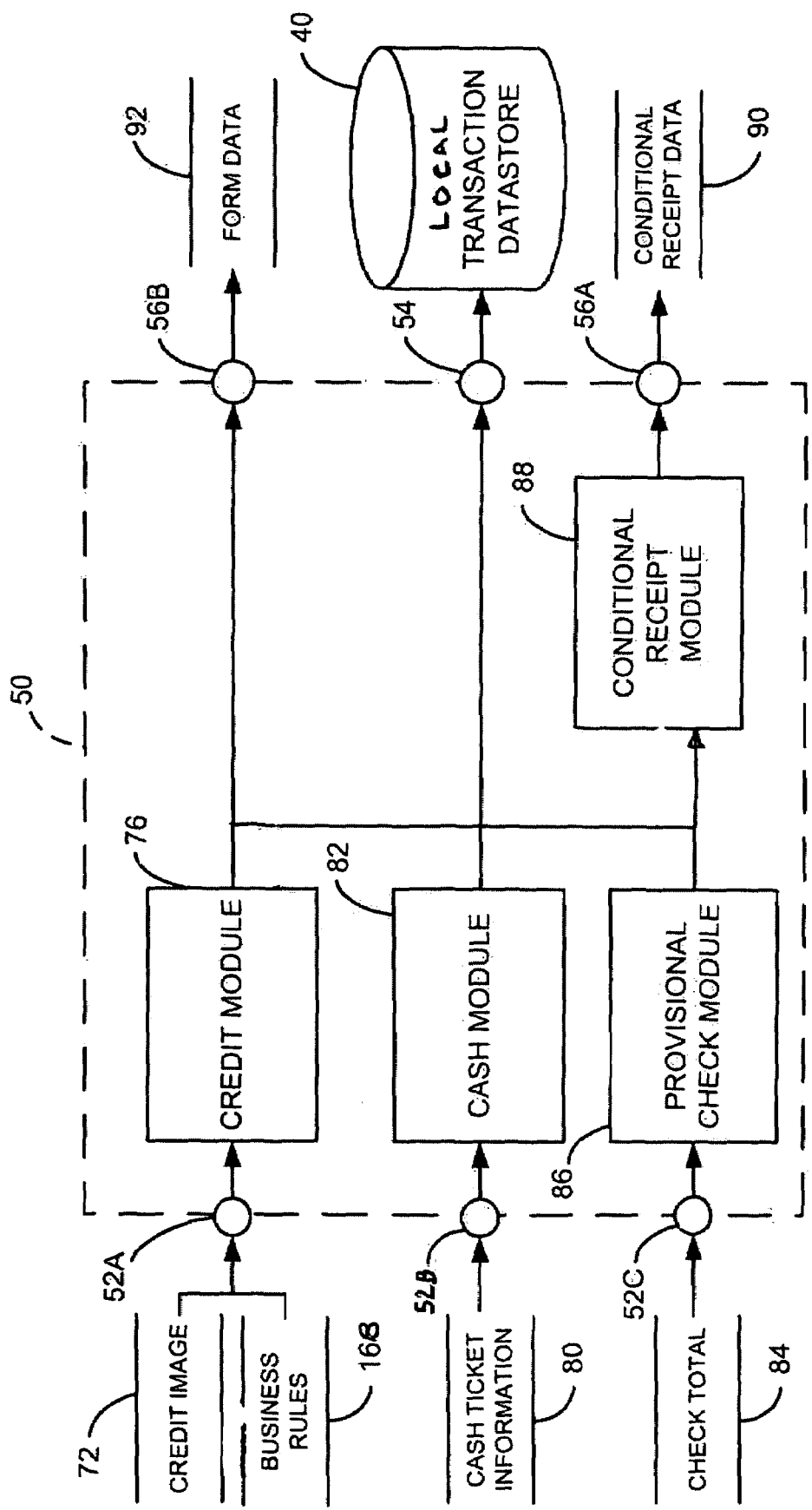
FIG. 3 is a functional block diagram illustrating a front counter transaction processing system in accordance with the present invention.

FIG. 3 illustrates the function of front counter transaction processor 50 in more detail. Data input 52A is receptive of scanned credit slip image 72 and business rules 16B. Credit module 76 receives input 52A and extracts and validates recognized fields of the credit image 74 according to business rules 16B. A transaction number is created and stored in local transaction datastore 40 along with extracted data via data output 54. A document identification number is assigned to the credit slip image. Data input 52B is receptive of cash ticket information 80 that is electronically entered after the cash portion of the transaction is tallied. Cash Module. 82 receives cash ticket information 80 and creates and stores a substitute cash ticket image with a document identification number in local transaction datastore 40 via data output 54. Data input 52C is receptive of an electronic entry for the total amount of the checks 84 in the transaction. Provisional check processor 86 inputs check total 84 and stores check total 84 with a conditional tag in local transaction datastore 40 via data output 54. Front counter transaction processor allows the operator to complete and balance the transaction without actually capturing and validating each check in the transaction. Conditional receipt module 88 inputs data from cash module 76, credit module 82, and provisional check module 86. Conditional receipt module 88 determines a conditional balance from the cash amount and check total and generates conditional receipt data 90 via data output 56A for a conditional receipt 42 that is given to the party of the transaction. Data output 56B outputs credit module data, cash module data, and provisional check module data that is used to populate viewable forms 92.

Figure 4:
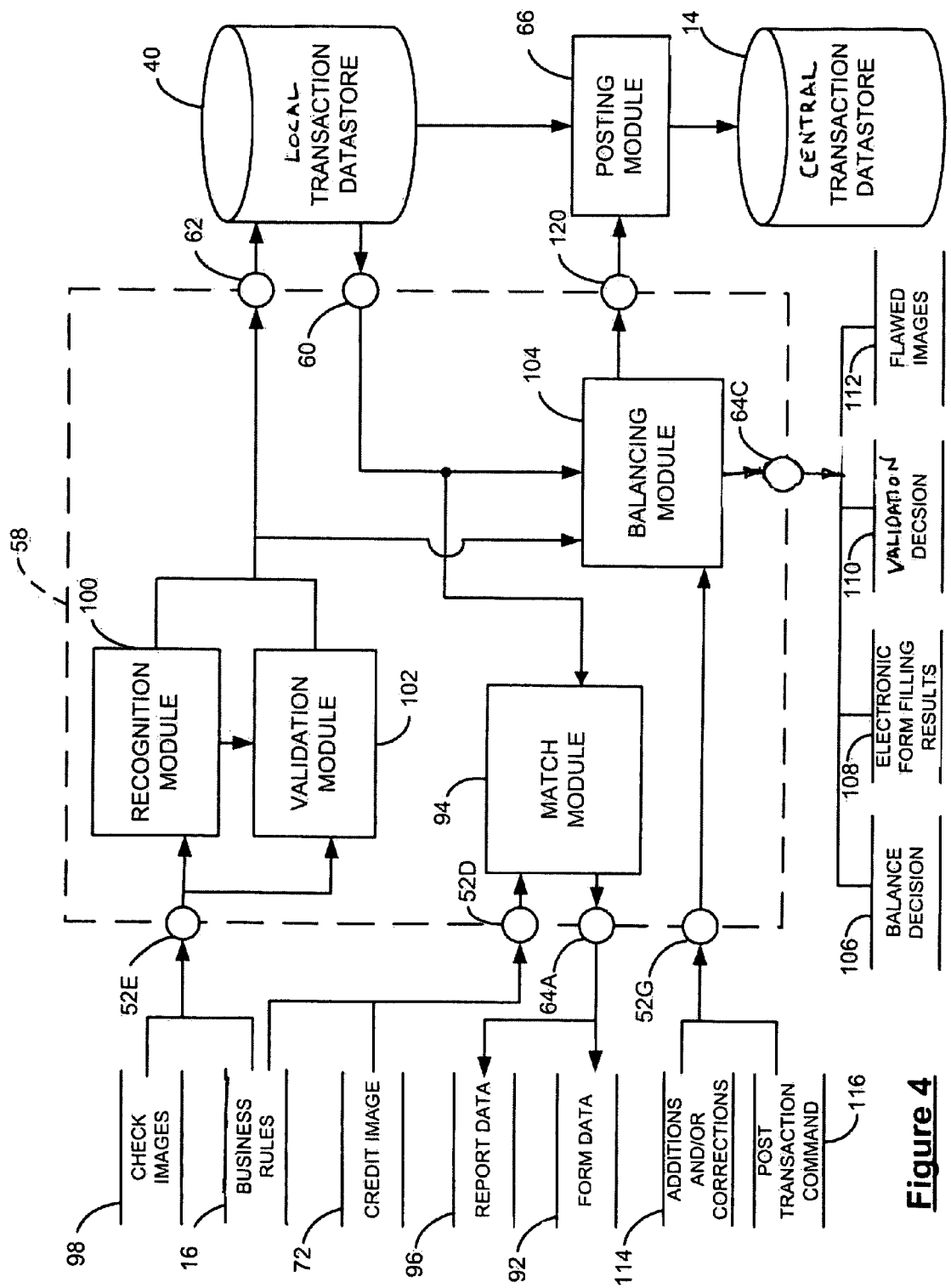
FIG. 4 is a functional block diagram illustrating a back counter transaction processing system in accordance with the present invention.

FIG. 4 illustrates the function of back counter transaction processor 58 in more detail. Data input 52D is receptive of credit image 72 and business rules 16 which are used to match the back counter transaction to a front counter transaction. Match module 92 receives credit image 72 and business rules 16 and extracts and validates recognized matching parameters of the credit image 72 according to business rules 16B. It is envisioned that matching parameters may be configurable and can be any of credit codeline data, cash-in and cash-out amounts and/or assigned transaction number. Match module 94 matches the parameters with data stored in local transaction datastore 40. The matched front counter transaction images and forms are input to match module via data input 60. The matching forms are displayed from form data 92 via data output 64A. Match module 94 provides the capability to create and output report data 96 via data output 64A containing a list of transactions captured at the front counter and not reprocessed at the back counter or any transactions at the back counter that does not have a corresponding front counter transaction.

Data input 52E is receptive of check images 98 and business rules 16B. Recognition module 100 and validation module 102 receive check images and business rules data 16B via data input 52E. Recognition module 100 performs feature analysis, extracts image details, and recognizes image content for form fields according to business rules 16B. Recognized image content is stored in local transaction datastore 40 via data output 62. Validation module 102 compares check images 98 and recognized image content to validation characteristics of business rules 16B. Validation module ensures that items of the transaction are complete, correct, and authentic.

Recognized form fields, flawed images, and a valdiation decision for each item are communicated from recognition module 100 and validation module 102 to balancing module 104. Balancing module 104 receives input from local transaction datastore 40, balances the transaction and communicates a balance decision 106, form filling results 108, one or more validation decisions 112 and/or flawed images 112 to an operator via output 64C. Data input 52G receives additions and/or corrections input 114 from the operator and an operator command to post the transaction 116. It is envisioned that an option to enter a post transaction command 116 may be withheld from the operator until the transaction is in balance. If the transaction is in balance, a post transaction command 116 is sent to posting module 66. Upon receiving the post transaction command 116 via data output 120, posting module 66 assembles item images together with substitute cash tickets and filled electronic forms of the transaction from local transaction datastore 40 and transmits the resulting transaction to central transaction datastore 14 of central location 12.

It is envisioned that transaction processor 34 may allow an operator to chose to complete both front counter transactions and back counter transaction at the front counter via input command 26. Further, it is envisioned that an operator may begin back counter transaction but not complete the transaction and have to defer back counter transaction processing for a later time. In such a case, match module 94 provides the capability to match front counter transaction and partially processed back counter transaction to the final back counter transaction without requiring the already processed back counter transaction to be performed again. Recognition module 100 prevents storing duplicate item images by recognizing that the item image has already been scanned and assigned a DIN.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the. skilled practitioner upon a study of the drawings, the specification and the following claims.

What is claimed is:

1. A system for processing financial transactions, comprising:
    an input receptive of a plurality of images of physical items of a transaction, wherein the images contain a visual record of transaction data;
    a front counter transaction processor at a point of presentment that processes at least a first item image and generates an incomplete transaction record including front counter transaction data, the front counter transaction processor including a conditional receipt module that inputs data including a transaction number, credit slip data, a cash total, and a conditional receipt total, determines a conditional balance and generates conditional receipt data from the input data;
    a back counter transaction processor at the point of presentment that processes the plurality of images of the transaction and generates back counter transaction data;
    a match module that matches back counter transaction data to front counter transaction data to generate a completed transaction record; and
    an output adapted to transmit front counter transaction data and back counter transaction data to at least one of form fields and a local transaction datastore.

2. The system of claim 1, wherein the input is receptive of business rules that dictate a process for validating the transaction.

3. The system of claim 2 further comprising a posting module that withholds the option to transmit front counter transaction data and back counter transaction data until the transaction is in balance as defined by the business rules.

4. The system of claim 1 further comprising a posting module that transmits front counter transaction data and back counter transaction data to a central location having a transaction datastore storing records of the transaction.

5. The system of claim 1 wherein the match module generates report data including at least one of a list of front counter transaction data that is not matched to back counter data and a list of back counter data that is not matched to front counter data.

6. The system of claim 1, wherein the match module matches the front counter transaction data to back counter transaction data using credit image data.

7. A system for processing financial transactions, comprising:
    an input receptive of a plurality of images of physical items of a transaction, wherein the images contain a visual record of transaction data;
    a front counter transaction processor at a point of presentment that processes at least a first item image and generates an incomplete transaction record including front counter transaction data, the front counter transaction processor including a cash module that inputs an electronic entry of a cash total, creates a substitute cash ticket image, and assigns a document identification number to the cash ticket image;
    a back counter transacton processor at the point of presentment that processes the plurality of images of the transaction and generates back counter transaction data;
    a match module that matches back counter transaction data to front counter transaction data to generate a completed transaction record; and
    an output adapted to transmit front counter transaction data and back counter transaction data to at least one of form fields and a local transaction datastore.

8. The system of claim 1, wherein the front counter transaction processor further comprises a check module that inputs an electronic entry of a check total and marks the check total as conditional.

9. A system for processing financial transactions, comprising:
    an input receptive of a plurality of images of physical items of a transaction, wherein the images contain a visual record of transaction data;
    a front counter transaction processor at a point of presentment that processes at least a first item image and generates an incomplete transaction record including front counter transaction data, the front counter transaction processor includes a credit module that inputs a credit slip image, extracts credit slip image data, assigns a document identification number and creates a transaction number;

a back counter transaction processor at the point of presentment that processes the plurality of images of the transaction and generates back counter transaction data;

a match module that matches back counter transaction data to front counter transaction data to generate a completed transaction record; and an output adapted to transmit front counter transaction data and back counter transaction data to at least one of form fields and a local transaction datastore.

10. A system for processing financial transactions, comprising:

an input receptive of a plurality of images of physical items of a transaction, wherein the images contain a visual record of transaction data;

a front counter transaction processor at a point of presentment that processes at least a first item image and generates an incomplete transaction record including front counter transaction data;

a back counter transaction processor at the point of presentment that processes the plurality of images of the transaction and generates back counter transaction data, the back counter transaction processor including:

a recognition module that extracts data from the plurality of images including a monetary amount using character recognition;

a validation module that determines whether the image and extracted image data is valid based on validation characteristics of an item;

a balancing module that determines whether the transaction is balanced based on the monetary amount; and an output that transmits data indicating whether the transaction is at least one of valid and balanced;

a match module that matches back counter transaction data to front counter transaction data to generate a completed transaction record; and an output adapted to transmit front counter transaction data and back counter transaction data to at least one of form fields and a local transaction datastore.

11. The system of claim 10 further comprising an input receptive of correction data.

12. A system for processing financial transactions, comprising:

an input receptive of a plurality of images of physical items of a transaction, wherein the images contain a visual record of transaction data;

a front counter transaction processor that processes a first item image and generates front counter transaction data;

a back counter transaction processor that processes the plurality of images of the transaction and generates back counter transaction data;

a match module that matches back counter transaction data to front counter transaction data; and an output adapted to transmit front counter transaction data and back counter transaction data to at least one of form fields and a local transaction datastore, wherein the back counter transaction processor further comprises:

a recognition module that extracts data from the plurality of images including a monetary amount using character recognition;

a validation module that determines whether the image and extracted image data is valid based on validation characteristics of an item;

a balancing module that determines whether the transaction is balanced based on the monetary amount; and an output that transmits data indicating whether the transaction is at least one of valid and balanced; and wherein the recognition module prevents duplication of the item image by recognizing if the item image has already been processed and wherein a document identification number is assigned to a non-duplicate item image.

13. A method of integrating front counter processing and back counter processing of a financial transaction at a point of presentment, comprising:

initiating communication with a party to a transaction at a point of presentment by accepting a plurality of physical items embodying the transaction;

processing at least one of the plurality of physical items of the transaction at a front counter of the point of presentment to generate an incomplete transaction record including front counter transaction data;

storing front counter transaction data in a datastore;

processing a remainder of the plurality of physical items of the transaction at a back counter of the point of presentment to generate back counter transaction data;

matching the front counter transaction data from the local datastore to back counter transaction data to generate a completed transaction record; and storing the completed transaction record to the datastore.

14. The method of claim 13, wherein processing physical items at the front counter comprises:

a receiving cash at the front counter;

determining a cash total; and generating a substitute cash ticket image.

15. The method of claim 13, wherein processing physical items at the front counter comprises:

receiving a credit slip at the front counter;

generating image data of the credit slip;

recognizing the image data;

validating the recognized image data by comparing the image data to a validation characteristic stored in a datastore; and generating credit slip data.

16. The method of claim 13, wherein processing physical items at the front counter comprises:

receiving a plurality of checks at the front counter;

accepting a check total without validating each of the plurality of checks; and marking the check total data as conditional.

17. The method of claim 13, wherein processing physical items at the front counter comprises balancing the transaction.

18. The method of claim 13, wherein processing physical items at the front counter comprises generating a conditional receipt from front counter transaction data.

19. The method of claim 13, wherein processing physical items at the back counter transaction comprises:

reading item images to generating an image record of each of the physical items and storing the image records;

validating the transaction by comparing a validation characteristic of at least one item to a validation characteristic defined by a set of business rules;

recognizing a monetary amount recorded on each of the image records by extracting the monetary amount from the image records;

balancing the transaction based on the monetary amount.

20. The method of claim 19 further comprising:
identifying invalid data as a result of validating the transactions;
correcting invalid data before balancing the transaction.

21. The method of claim 20, wherein correcting invalid data is done at a location other than the point of presentment.

22. The method of claim 13 further comprising generating a report that includes at least one of a list of front counter transaction data that is not matched to back counter data and a list of back counter data that is not matched to front counter data.

23. The method of claim 13, wherein matching the front counter transaction data and the back counter transaction data is defined by matching credit image data to credit image data stored in local transaction datastore.

24. The method of claim 23, wherein the credit image data are configurable and can be at least one of codeline data, cash-in and cash-out data, and a transaction number.

25. A method of integrating front counter processing and back counter processing of a financial transaction at a point of presentment, comprising:
initiating communication with a party to a transaction at a point of presentment by accepting physical items embodying the transaction;
processing physical items of the transaction at a front counter to generate front counter transaction data;
storing front counter transaction data in a datastore;
processing physical items of the transaction at a back counter to generate back counter transaction data;
matching the front counter transaction data from the local datastore to back counter transaction data to generate completed transaction data;
storing completed transaction data to the datastore; and
populating form fields with generated front counter transaction data and back counter transaction data.

26. A method of integrating front counter processing and back counter processing of a financial transaction at a point of presentment, comprising:
initiating communication with a party to a transaction at a point of presentment by accepting physical items embodying the transaction;
processing physical items of the transaction at a front counter to generate front counter transaction data;
storing front counter transaction data in a datastore;
processing physical items of the transaction at a back counter to generate back counter transaction data;
matching the front counter transaction data from the local datastore to back counter transaction data to generate completed transaction data; and
storing completed transaction data to the datastore,
wherein processing physical items at the back counter further comprises recognizing whether the item images have already been processed and preventing duplicate document identification numbers.

* * * * *